United States Patent [19]

Hunter

[11] Patent Number: 5,552,992
[45] Date of Patent: Sep. 3, 1996

[54] METHOD AND SYSTEM FOR REPRODUCTION OF AN ARTICLE FROM A PHYSICAL MODEL

[75] Inventor: Charles R. Hunter, Sterling Heights, Mich.

[73] Assignee: Larry J. Winget, Leonard, Mich.

[21] Appl. No.: 332,951

[22] Filed: Nov. 1, 1994

[51] Int. Cl.$^6$ .............................. G06F 19/00; G06T 17/00
[52] U.S. Cl. ................................ 364/468.25; 364/474.05; 364/474.24; 395/120; 395/161
[58] Field of Search ..................... 364/468, 474.05, 364/474.24, 188, 189, 191–193; 395/119, 120, 161; 219/121.78, 121.81, 121.82, 121.83, 121.85

[56] References Cited

U.S. PATENT DOCUMENTS

| | | | |
|---|---|---|---|
| 4,742,464 | 5/1988 | Duret et al. | 364/474.05 X |
| 5,092,022 | 3/1992 | Duret | 364/474.05 X |
| 5,197,013 | 3/1993 | Dundorf | 364/474.05 X |
| 5,257,203 | 10/1993 | Riley et al. | 364/474.05 |
| 5,432,703 | 7/1995 | Clynch et al. | 364/474.05 |
| 5,452,219 | 9/1995 | Dehoff et al. | 364/474.05 |

Primary Examiner—Joseph Ruggiero
Attorney, Agent, or Firm—Brooks & Kushman P.C.

[57] ABSTRACT

The surface of a clay model is laser scanned to obtain a set of laser scan data. The scan data provides X, Y and Z values of the part. The raw scan data is then preferably edited to smooth, filter, and pre-process it for further use. A first algorithm implemented at an engineering workstation is used to create a first set of equations which represent a three-dimensional surface of the model from the edited set of scan data. A second algorithm utilizes known wire frame data for the part model to compute a second set of mathematical equations. The first set of equations and the second set of equations represent surface(s) and characteristics of the model in a recorded format usable by CAD-based systems to facilitate part design and tool construction. A third algorithm generates an NC tool path data from the first and second set of equations. The NC tool path data may be utilized at a machining center to cut a production part mold, or a direct reproduction of the model. The method may be utilized iteratively from different views of the model to obtain data which represents multiple aspects or facets of the model.

14 Claims, 2 Drawing Sheets

METHOD AND SYSTEM FOR REPRODUCTION OF AN ARTICLE FROM A PHYSICAL MODEL

TECHNICAL FIELD

This invention relates to methods and systems for adaptation of laser scanning technology to the manufacturing process, and, in particular, to activities involving the designing, prototyping, and production tooling of and for articles to be manufactured.

BACKGROUND ART

Laser scanning is a mensuration technique which has been used to collect data points from the surface of a three-dimensional article. The data points correspond to coordinate values over the surface of the scanned article, e.g. taken along the X, Y, and Z axes. The laser scan head traverses a scan path over the surface of the article, and at selectable distances along the path point values may be taken. The laser scan generally results in generation of a set of scan data in a digitized format.

The further use of the laser scan data in practical manufacturing application has been limited due to a number of factors. One factor is the great magnitude of data which must be processed relative to other mensuration techniques. Another factor is the limited ability of extant laser scan software algorithms to recognize or differentiate surface transition features (corners, vertices, openings, boundaries, etc.) of the scanned article. Yet another factor is the incompatibility of CAD/CAM software to the laser scan data file format. Still another factor is the difficulty in correlating the scan path of the laser head to a desired tool path for a numerically-controlled machine tool. A correlation between the laser scan path and the NC tool cutting path may result in gouging or scalloping of the work. These limitations become pronounced when laser scanning is used for capturing the geometry of parts such as automotive trim parts. These features are typically complex free-form shapes and require many measurements to accurately define the shapes. Determining the true position of their free form surfaces can be quite difficult.

In the automotive industry, as representative of the manufacturing field, an established mensuration technique is the coordinate measuring machine (CMM). A CMM uses a mechanical probe which traverses a path covering the surface of the article to be measured. CMM machines typically work with algorithms that recognize part features, such as edges, from user supplied nominal locations. A CMM process, however, is slow, interactive and operator intensive. In comparison, laser scanning is not highly interactive but it has required feature determination off-line through statistical processing.

SUMMARY OF THE INVENTION

It is an object of the present invention to provide a method and system for reproducing a physical model of an article by user of laser scanning which affords greater flexibility and capability in designing, prototyping, and production tooling of and for the article.

Another object of the present invention is to provide a method and system for reproducing an article in a manufacturing environment by use of laser scanning in a manner which overcomes the limitations of conventional laser scanning techniques.

The method and system include the steps of: (i) scanning a laser beam of controlled light over the surface of the model at an inspection station to generate reflected light signals, which when applied to a photodetector means produce corresponding electrical signals; (ii) digitizing the electrical signals as scan data; (iii) converting the scan data into mathematical formulae which represent the three-dimensional surface of the model; (iv) recording the three-dimensional surface representation in a data format useful for product design; and/or (v) processing the three-dimensional surface representation of the model into a data format useful for a numerically-controlled machine tool to cut a representation of the article, or tool for molding or other forming process.

The above scanning step may be repeatedly performed to generate multiple sets of scan data from different aspects of the physical model. The sets of scan data are then combined to obtain a multi-facet representation of the model.

In the above method and system, the scan data may be viewed and checked at an engineering work station to verify conformity to the model, and modified if desired. Also, the modified scan data can be supplied to NC machining software to construct NC tool paths. The tool path data may then be supplied to a machining center to execute the NC tool paths and duplicate the article. This process allows incorporation of design modifications performed on scan data to be used in the production of a model or a vacuum form mold.

Systems are also provided for carrying out each of the above methods.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
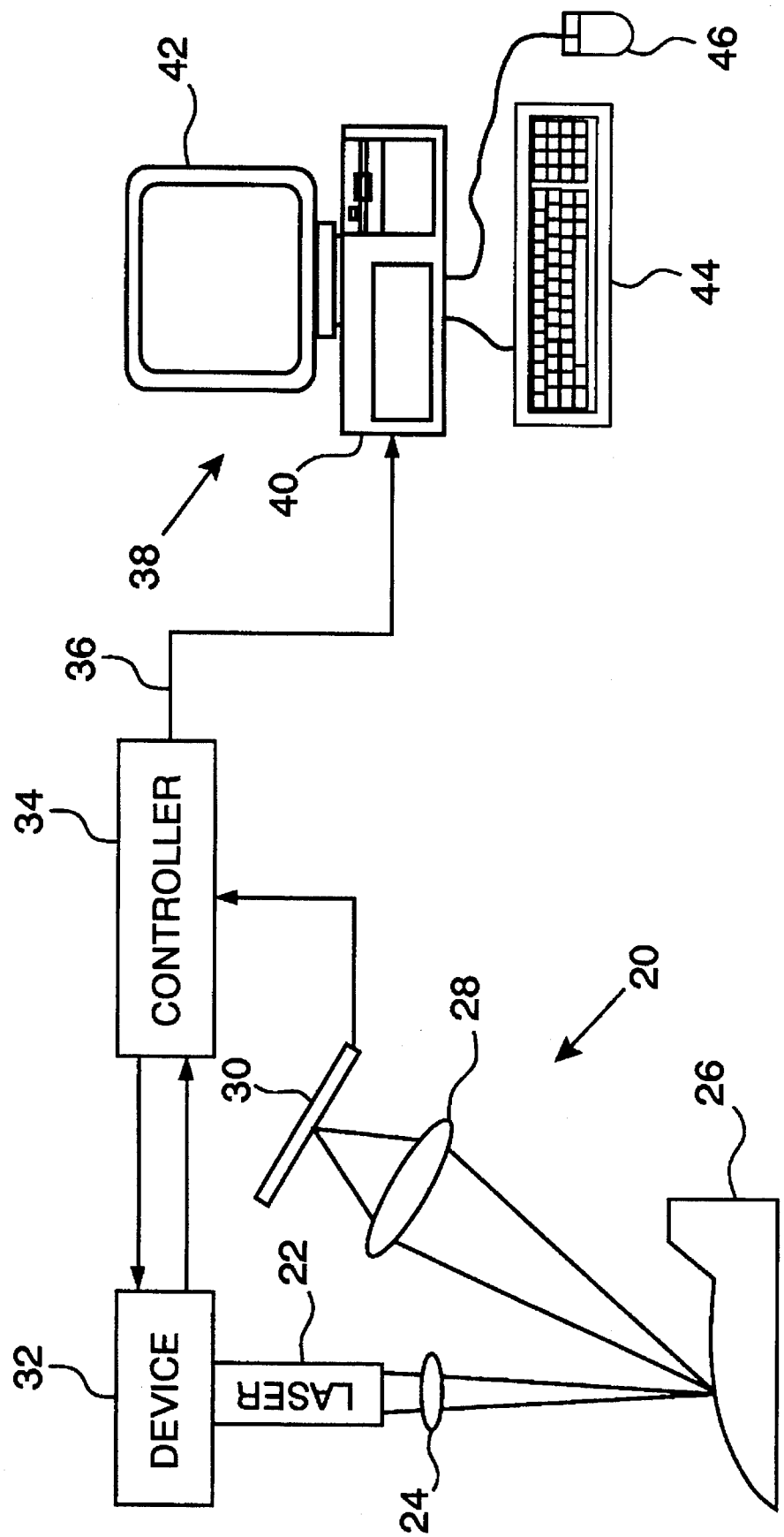
FIG. 1 is a schematic view of a laser scanner operation in accordance with the present invention.

Referring now to the drawing figures, there is illustrated in FIG. 1 a programmable digitizer or laser scanner, generally indicated at 20. A beam of laser light is generated by a laser 22 and is focused by a lens 24 on a physical model of a part 26 being scanned to produce an illuminated spot. The reflected light is incident on an "eye" or lens 28 that focuses the image of the spot onto a sensor 30 mounted at an angle to the axis of the laser beam. The sensor 30 served a transducer function of responding to light energy by converting it into a representative electrical signal. The sensor is preferably a charge coupled device (CCD), although this function admits to implementation by equivalent devices as would be known or suggested to those of skill in the art. The position at which the image of the spot impinges on the CCD is a function of the distance of the point being scanned to the scanner 20.

In operation, the laser 22 is mounted for movement on a translational device 32. The device 32 traverses the laser 22 over the surface of the model 26 being scanned along X and Y axes in a series of linear scans defining an overall scan path. The device 32 typically is movable on or about 3 to 6 axes.

The laser scanner 20 communicates with a controller 34 of the device 32 and adjusts the Z axis to maintain the scanner 20 within a predetermined depth of field. The Z dimension value returned along a line 36 from the scanning system is then derived by combining the Z axis servo move and the relative position signal given by the laser scanner 20.

The Z dimension, together with the X and Y values of the part, are input to a computer or engineering workstation, generally indicated at 38. The workstation 38 includes a chassis 40, a display screen 42, a keyboard 44, and a mouse 46, all connected in a typical fashion. The workstation 38 is typically programmed to have a graphical user interface.

An algorithm may be employed to move the scanner 20 up or down based on the last series of points scanned. This system works effectively for smoothly varying contours of parts. However, when a discontinuity in the surface of a part is encountered, like the vertical wall of a hole, the system must search up and down until the spot falls on the sensor.

When scanning a part, a user first defines the polygonal boundary of the area of the model 26 to be scanned. The polygonal boundary defines a window which may be obtained from an engineering part or wire frame data which, in turn, is obtained from the part designer. The boundary values and surface transitions and predetermined characteristics of the part under design or to be manufactured. In the parlance of CAD-based systems this is known as "wire frame data." Wire frame data defines the various boundaries of the part and includes (i) trim line data which define where one part begins and another part ends, and (ii) feature line data where the surface has pronounced changes in geometry. The polygonal boundary may be defined by inputting X,Y coordinates, or by moving the laser probe to the points in a "teach" mode. This distance between points along a scan and the distance between scan lines is also user selectable. Rectangular grids may be specified but are not required.

Such a laser scanner is manufactured by Laser Design, Inc. of Minneapolis, Minn., under its "Surveyor" model series, and is schematically described in U.S. Pat. No. 5,124,524. The workstation 38 may include a software program entitled "DataSculpt", also available from Laser Design, Inc., which "edits" or processes the raw scan data by performing the CAD-like edits of smoothing, filtering, blending, merging, parameterization, ordering, sequencing, and offsetting.

Figure 2:
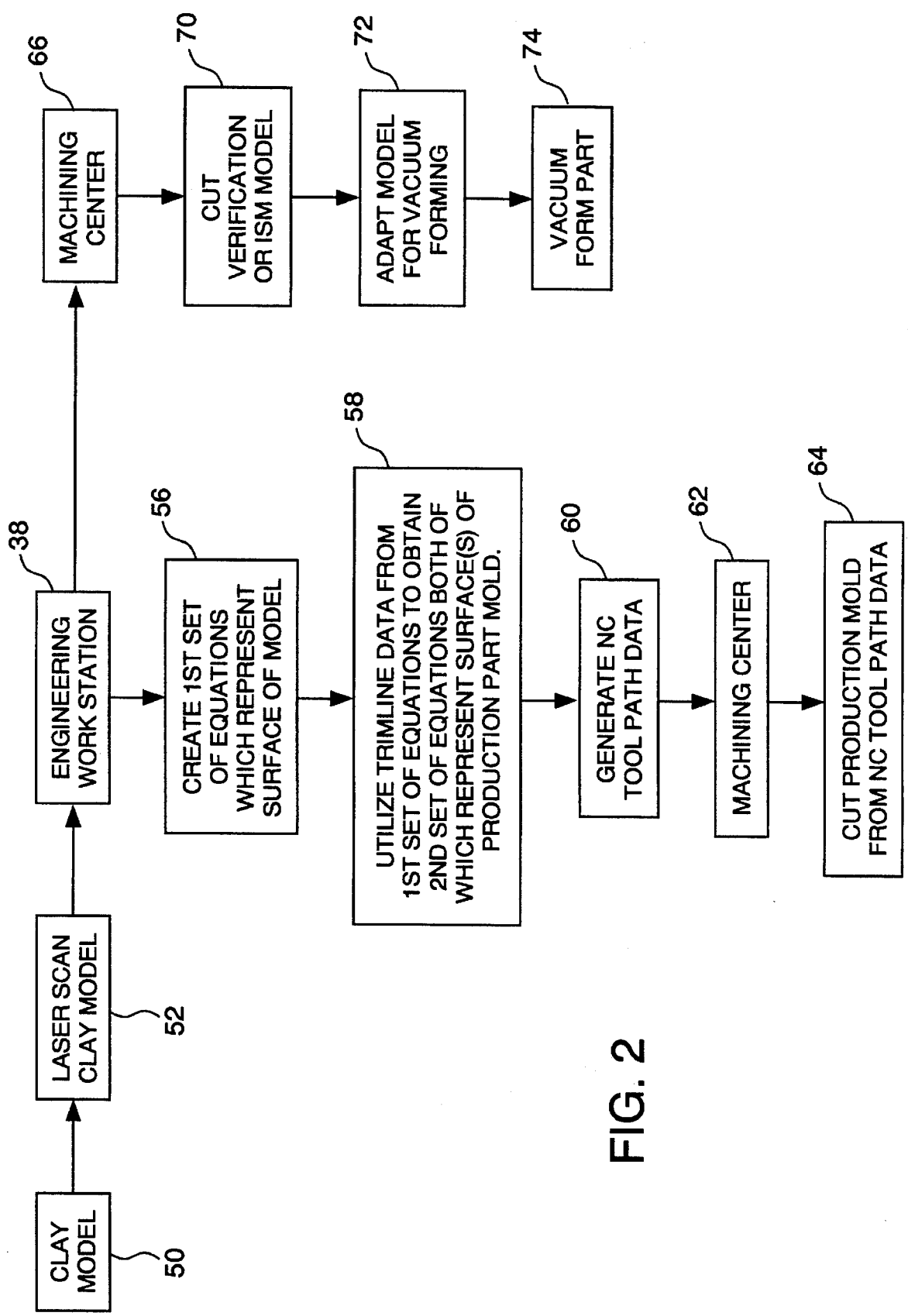
FIG. 2 is a block diagram flow chart illustrating the method and system of the present invention.

Referring now to FIG. 2, there is illustrated in block diagram form the method and system of the present invention.

At block 50, a clay model of a part to be scanned is positioned on an X-Y table of the laser scanner 20. The table may translate in a horizontal plane relative to the laser 22 or the laser 22 may move in a horizontal plane. The laser scanner 20 then provides polylines which are sets of digitized X, Y, Z pointsets (i.e. scan data) upon scanning the clay model at block 52.

The scan data is then supplied to an engineering workstation 38 wherein digitized wire frame data of the part is stored. The workstation preferably is a Silicon Graphics Unix workstation having data editing capability. The wire frame data is compared with the polyline data and if there is a "match" (within a predetermined tolerance such as a few thousandths of an inch), then one can proceed with surface creation. If there is no "match", then styling and/or engineering changes must be made. A "match" verifies conformity of the scan data with the digitized wire frame data.

If there is a "match", the scan data is then operated upon by a first software package to convert it into a first set of mathematical equations which represents a three-dimensional surface of the part or model. Each equation in the first set represents a functional relationship between or among the coordinate values of a polygonal mesh element on the model surface. For example, the equation defines the Z value as a function of X and Y values over the range of X and Y coordinate values for the polygonal mesh element. The equation is determined by statistical algorithmic logic applied to the scan data values within the range of coordinate values for the mesh element. The conversion of the scan data into a mathematical formula allows the surface characteristics of the model to be accurately and efficiently represented in a format useful for further design and manufacturing activities without burdening the system with the need for further processing of each discrete laser scan data point set. This is an exemplary format for the first set of equations; the objective is to reduce the laser scan point data into a three-dimensional surface representation of the model which is useful to a CAD-based downstream system. The particular format logic of the first set of equations is therefore determined, at least in part, by the downstream data processing, which is normally CAD-based, as will be understood by those of skill in the art. Preferably, the first software package is the "Design Concept 3D", Version 3.2 or 4.1 and is available from Computer Design, Inc. of Grand Rapids, Mich. This step of creating the first set of equations is accomplished at block 56 and achieves NURBS or Bezier-based surfaces. The first set of mathematical equations is placed in IGES format prior to entering block 58.

At block 58, the first set of mathematical equations is supplemented by a second set of mathematical equations by a second software package. Together, the first and second sets of mathematical equations represent necessary surface characteristics of the physical model to enable reproduction of the model; e.g., such as by a mold tool built by NC machining a negative pattern of the model as a tool cavity. The second set of equations may incorporate the wire frame data and other ancillary surface features useful to reproduction of the model, such as the location, geometry, and dimensions of slides, pins, parting lines, etc. of a production mold tool. Preferably, this software package is entitled "Command Software", Version 6.1.3 (bp), released Mar. 6, 1994, and is available from Camax Systems, Inc. of Minneapolis, Minn.

The conversion of the laser scan data into the first set of equations, and the computation of the second set of equations incorporating trim line and feature line data, are usable in a downstream CAD-based product design system. The three-dimensional representation of the model, as captured in these mathematical formulae, enable the product and tool designers to realize the power of laser scanning in a format compatible to and useful with a CAD-based system. The product designer may generate from these formulae graphics of the physical model of the part, e.g., a "part blueprint as a two-dimensional orthogonal projection," to facilitate the design process, or to certify the design against certification or approval criteria. Additionally, the mathematical formulae may be used to reproduce the model in three dimensions, such as by NC machining a prototype, or NC machining a mold tool, as described in the following.

A third software package operating on the same or different workstation as indicated at block 60 generates an NC tool path data from the first and second sets of equations. Preferably, this third software package is entitled WORK NC and is available from the company Sescoi S.A., having an office in Southfield, Mich. Typically, this software package converts the first and second sets of equations into cutter path data which is then converted into NC tool path data for a particular machining center. At block 62, the tool path data is then sent to a machining center 62 which, at block 64, cuts a production mold from the NC tool path data.

The scan data may be acted on directly at the engineering work station 38 to construct NC tool paths from the scan data. These tool paths are then supplied to a machining center 66 in a simplified process which bypasses the surface modeling based on the scan data. This simplified process is useful for expedited one-to-one prototype reproduction of the article, either for use directly, or as a pattern for a prototype mold.

At block 70, the machining center 66 can cut a verification ISM model from a converted version of the NC tool path data which represents the backside surface (ISM) of the part. The ISM model is formed from ISM scans and by offsetting the ISM scans to create an ISM cutter path. The conversion process (i.e. offsetting for material thickness) can occur at the engineering workstation 38 or other data processing facility.

At block 72, the mold can be adapted for vacuum forming by (1) building a wood mold around the model, (2) making a fiberglass cast of the wood mold, and (3) then drilling one or more holes through the part area of the cast.

The cast (now a mold) is set in a vacuum form machine to make a prototype plastic part at block 74. The vacuum formed part may then be scanned, modified and then re-scanned as is necessary.

In view of the above, it is clear that one can merge multiple scans of an entire complex object from different views. This provides a complete description of such an object which then can be exported to an engineering workstation such as the engineering workstation 38.

While the best mode for carrying out the invention has been described in detail, those familiar with the art to which this invention relates will recognize various alternative designs and embodiments for practicing the invention as defined by the following claims.

What is claimed is:

1. A method of reproducing an article based on a physical model comprising the steps of:

scanning the physical model by a light mensuration technique to obtain a set of scan data indicative of dimensional characteristics of the model;

converting the set of scan data into a first set of equations representative of characteristics of the physical model in a plurality of dimensions;

computing a second set of equations derived from predetermined data based on dimensional characteristics of the model wherein the dimensional characteristics of the second set of equations are based, at least in part, on wire frame data including trim line data and feature line data for the article; and recording the set of equations representative of the dimensional characteristics of the physical model in a data format useful for reproduction of the article.

2. The method of reproducing an article as defined in claim 1, comprising the further step of processing the set of equations to generate a tangible reproduction of the article in two or more dimensions.

3. The method of reproducing an article as defined in claim 2, wherein the processing step includes generation of a two-dimensional graphic reproduction of the article.

4. The method of reproducing an article as defined in claim 2, wherein the processing step includes generating a three-dimensional reproduction of the article.

5. The method of reproducing an article as defined in claim 2, wherein the processing step includes generating a three-dimensional negative reproduction of the article.

6. The method of reproducing an article as defined in claim 1, comprising the further step of processing the set of equations to generate a tool path for machining a reproduction of the article.

7. The method of reproducing an article as defined in claim 6, wherein the processing step includes generating a tool path for machining a reproduction of the article in negative form.

8. A system for reproducing an article based on a physical model, the system comprising:

means for scanning the physical model by a light mansuration technique to obtain a set of scan data indicative of dimensional characteristics of the model;

means for converting the set of scan data into a set of equations representative of the characteristics of the physical model in a plurality of dimensions;

means for computing a second set of equations derived from predetermined data based on dimensional characteristics of the model wherein the dimensional characteristics of the second set of equations are based, at least in part, on wire frame data including trim line data and feature line data for the article; and means for recording the set of equations representative of the dimensional characteristics of the physical model in a data format useful for reproduction of the article.

9. The system as claimed in claim 8 further comprising means for processing the first set of equations to generate a tangible reproduction of the article in two or more dimensions.

10. The system as claimed in claim 9 wherein the means for processing includes means for generating a two-dimensional graphic reproduction of the article.

11. The system as claimed in claim 9 wherein the means for processing includes means for generating a three-dimensional reproduction of the article.

12. The system as claimed in claim 9 wherein the means for processing includes means for generating a three-dimensional negative reproduction of the article.

13. The system as claimed in claim 8 further comprising means for processing the first set of equations to generate a tool path for machining and reproduction of the article.

14. The system as claimed in claim 13 wherein the means for processing includes means for generating a tool path for machining a reproduction of the article in negative form.

* * * * *